March 24, 1970 N. M. WINSLOW 3,501,944
APPARATUS FOR MEASURING PORE SIZE AND PORE VOLUME
Filed Jan. 3, 1969 3 Sheets-Sheet 1
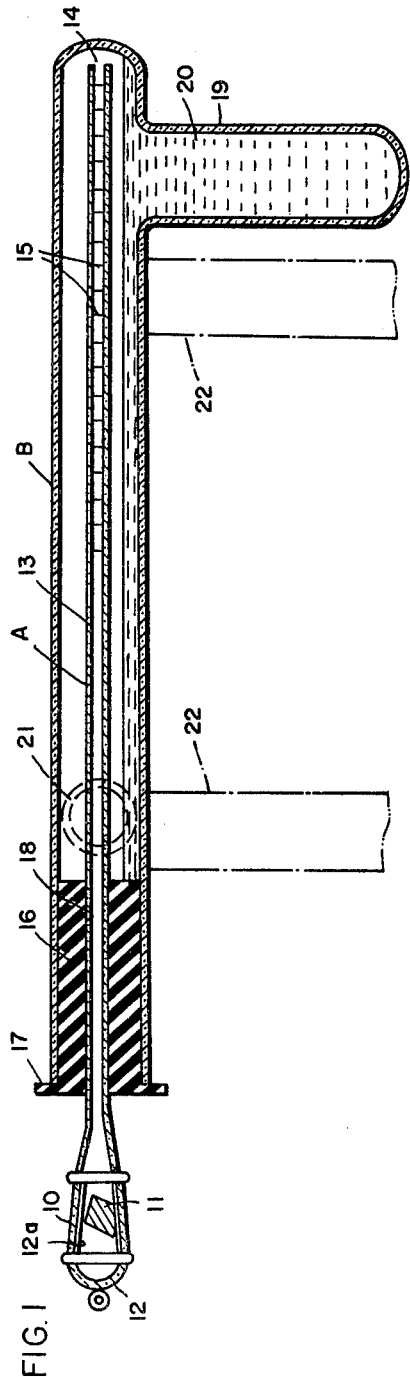
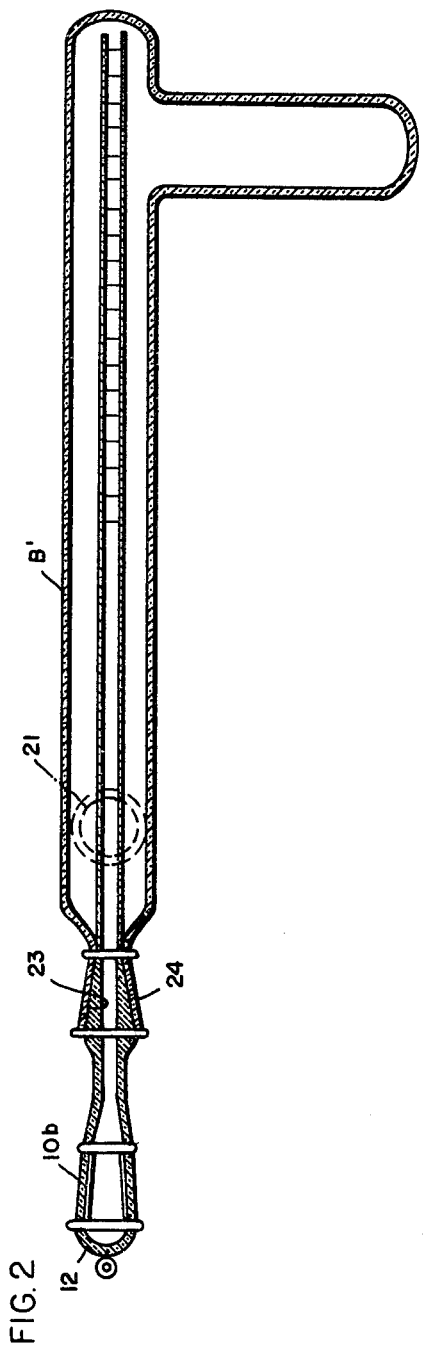
INVENTOR:
NATHANIEL M. WINSLOW
BY
Dawson, Tilton, Falloy & Lungenus
ATT'YS March 24, 1970   N. M. WINSLOW   3,501,944
APPARATUS FOR MEASURING PORE SIZE AND PORE VOLUME
Filed Jan. 3, 1969   3 Sheets-Sheet 2
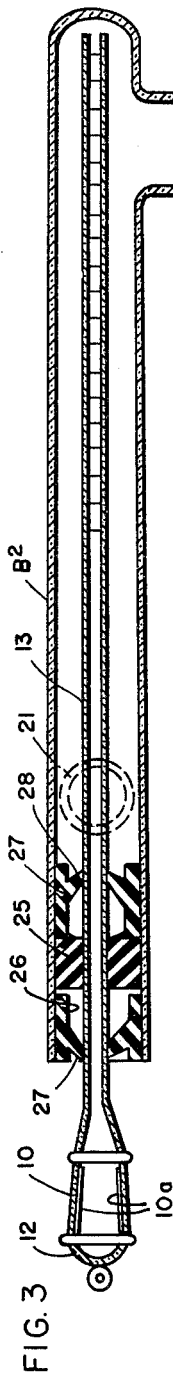
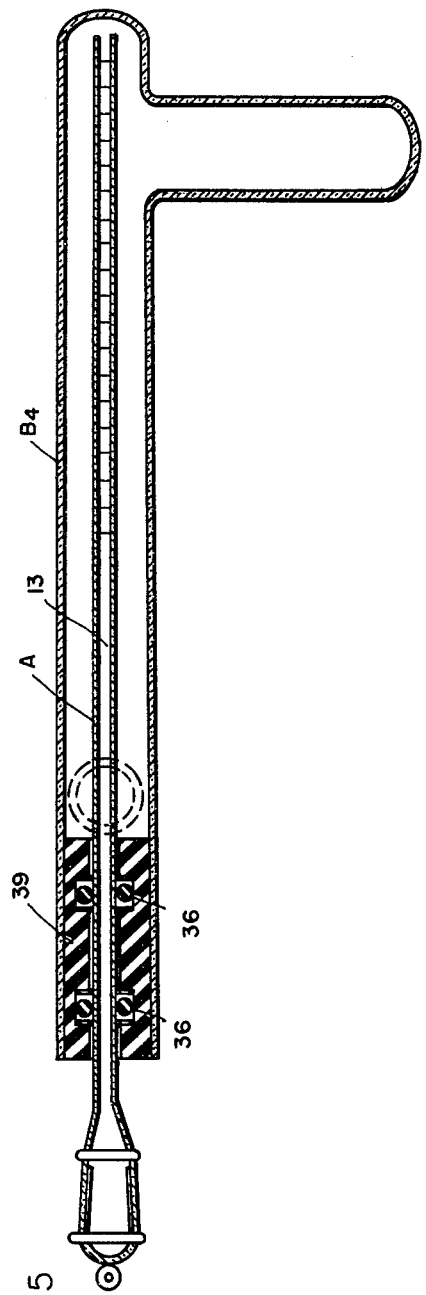
INVENTOR:
NATHANIEL M. WINSLOW
BY
Dawson, Tilton, Fallon & Lungmus
ATT'YS March 24, 1970     N. M. WINSLOW     3,501,944
APPARATUS FOR MEASURING PORE SIZE AND PORE VOLUME
Filed Jan. 3, 1969     3 Sheets-Sheet 3
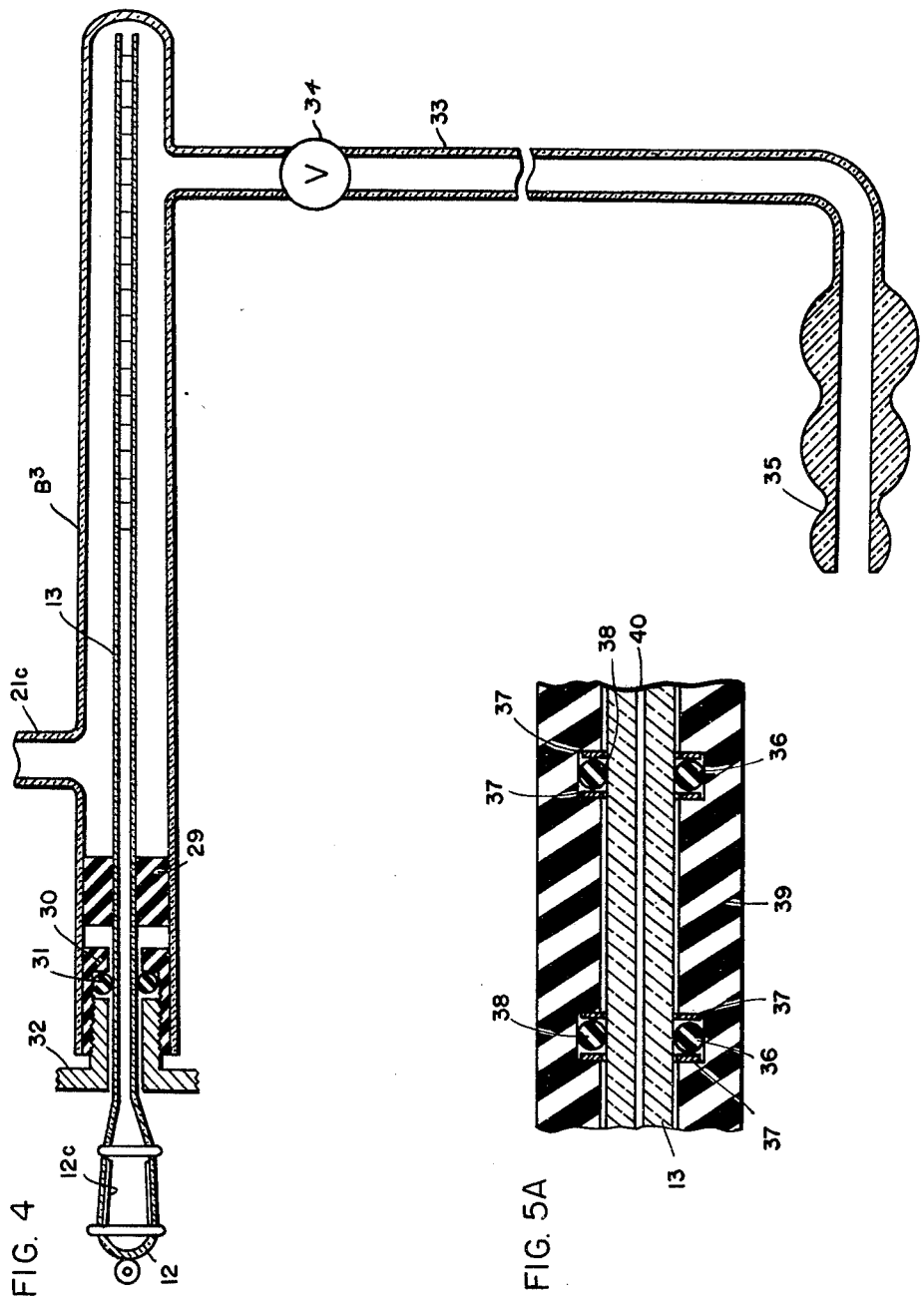
INVENTOR:
NATHANIEL M. WINSLOW
BY
Dawson, Tilton, Falloy & Lungmus
ATT'YS

United States Patent Office 3,501,944
Patented Mar. 24, 1970

---

3,501,944
APPARATUS FOR MEASURING PORE SIZE AND PORE VOLUME
Nathaniel M. Winslow, Cleveland, Ohio, assignor to Prado Laboratories, Inc., Lakewood, Ohio, a corporation of Ohio
Continuation-in-part of application Ser. No. 583,838, Oct. 3, 1966. This application Jan. 3, 1969, Ser. No. 788,849
Int. Cl. G01n 15/08
U.S. Cl. 73—38                  12 Claims

ABSTRACT OF THE DISCLOSURE

The penetrometer has at one end a chamber for receiving a sample of porous material and a removable sealing closure for the chamber together with a hollow stem communicating with the chamber at one end, the stem being open at its other end. The stem is supported within one end of a tubular body which has its other end closed and with the open end of the stem spaced from the closed end of the tubular body. Means are provided for connecting the tubular body alternately with vacuum and gas sources, and means are provided for supplying liquid through the tubular body for filling the penetrometer through the open end of the stem and for withdrawing liquid from the open end of the stem, the penetrometer having its material-receiving chamber outside the tubular member while its stem remains sealed and supported within the tubular body.

RELATED CASE

This application is a continuation-in-part of my co-pending application Ser. No. 583,838, filed Oct. 3, 1966, now patent No. 3,438,245.

BACKGROUND AND SUMMARY

In apparatus heretofore disclosed for measuring pore size and pore volume, the penetrometer material-receiving chamber has been enclosed and placed in communication with the chamber which is to be evacuated or subjected to pressure and is not readily accessible; further, there are limitations upon the size and shape of the chamber by reason of this arrangement. Also, considerable manipulation is generally required in order to properly position the penetrometer.

The shape of prior apparatus also has presented difficulties. For example, constrictions in the outer body may cause distortion in reading the calibrations, or, if the uncalibrated length of the penetrometer is increased to position the calibrations away from constrictions, then each body may accommodate only a single length penetrometer.

I have discovered that the sample-receiving chamber of the penetrometer can be directly exposed and made accessible for the insertion and removal of samples while at the same time substantially reducing the size of the chamber which is subjected to vacuum and pressure. The penetrometer and body may be readily positioned and sealed merely by sliding the penetrometer into the body. The cylindrical body does not distort the calibrations, and the absence of constrictions permits the body to be used with a variety of penetrometers of different lengths.

Further, the sample chamber of the penetrometer is exposed while the stem is supported and sealed within an end of the tubular member so that all the vacuum, pressure and liquid supplying operations may be carried on with the stem sealed at the end of the tubular member.

DRAWINGS

In the accompanying drawings, FIG. 1 is a side view in elevation of a filling device embodying my invention, the supporting sleeve being shown in section; FIG. 2, a side view in elevation of a modified form of filling device embodying my invention; FIG. 3, a view similar to FIG. 1, but showing the sealing and supporting means in longitudinal section and representing a modified form of the invention; FIG. 4, a broken view in side elevation with the supporting means and sealing means shown in section, this structure showing a modified form of the invention; FIG. 5, a view similar to FIG. 1 showing modified sealing and supporting means; and FIG. 5A, an enlarged view of a portion of FIG. 5.

DETAILED DESCRIPTION

In the illustration given in FIG. 1, a penetrometer A is partially enclosed within a transparent tubular member B, which may be formed of glass, plastic, or any suitable material.

The penetrometer A is provided at one end with an enlarged portion 10 forming a chamber adapted to receive a sample of porous materials 11 which is to be tested. The chamber is closed at its outer end with a removable closure 12 which may be of any suitable construction. In the illustration shown, the closure 12 has inwardly-extending portions 12a tightly engaging the inner walls of the chamber 10 and thus forming a tight seal therewith. However, it will be understood that any type of closure which will provide a vacuum seal and pressure seal may be employed. If desired, a gasket-equipped closure may be provided, but generally where the parts are formed of glass or resin, parallel overlapping flange portions such as 12a provide a satisfactory seal.

The stem member 13 of the penetrometer is open at its outer tip 14 and is provided near its portion with a series of graduations or calibration marks 15. The internal volume of the stem from the open tip together with the volume of the sample bulb or chamber 10, forms a continuous space within the penetrometer.

The tubular body B is closed at one end adjacent the open end 14 of the stem 13 and is open at its other end to receive a supporting and sealing sleeve 16. If desired, the sleeve 16 may be provided at its outer end with a flange 17. The member 16 provides a seal through which the penetrometer stem 13 can be inserted and which is gas-tight to (a) permit the pumping of vacuum on the inside of the device, and (b) hold pressure within the device if it is desired to apply pressure higher than the external atmospheric pressure. The sleeve may be formed of rubber, synthetic rubber, resin, or other sealing material. The stopper or sleeve 16 could be first secured on the stem and then inserted into the tubular member B; or it could be tightly squeezed into the open end of the tubular member B and the stem then inserted, with or without a sealing lubricant, into the bore or hole 18 of the plug or stopper 16. In the preferred arrangement, the stem of the penetrometer is in horizontally sliding and rotational relation to the sleeve 16.

Any suitable means for supplying mercury or other liquid to the chamber of the filling device B may be employed. In the illustration given in FIG. 1, I provide a reservoir tube 19 filled with mercury or other liquid 20, the mercury also extending slightly into the elongated chamber of the tubular member B. The reservoir tube 19 is preferably substantially perpendicular to an inlet pipe 21 which may be alternately connected by the use of valve means to a source of vacuum and to a source of gas. The reservoir tube 19 may be of any shape and size convenient and consistent with the flow of mercury from the reservoir into the chamber of the tubular body B, and vice versa, to immerse the stem of the penetrometer, and subsequently after filling the penetrometer to free the tip 14 from excess mercury. Conveniently, as shown, the tube 19 is tubular in shape, intimately formed with the tubular member B and with a volume about one-third that of the chamber provided by the tubular member B.

In the use of the structure shown in FIG. 1, I prefer to mount the tubular member B upon a support frame 22 in the form of vertical blocks on which the tubular member B may rest in a horizontal plane. If desired, clamps or other securing means may be employed for anchoring the member B upon the supports 22.

In the assembly of the apparatus, it is necessary to fill the reservoir 19, and this may be accomplished by introducing a large amount of mercury through the open end of the tubular member B before the sleeve 16 is in place and to the extent illustrated in FIG. 1. The sleeve 16 may then be inserted under pressure within the tubular member B to form a tight seal therein, and thereafter the stem 13 may be inserted, as shown in FIG. 1. If desired, the stem 13 may be first assembled within the sleeve 16 and the combined structure then pressed within the open end of the tubular member B, as shown in FIG. 1. The porous sample 11 may be placed in the chamber of the bulb 10 and the closure 12 pressed into sealing relation with the bulb 10. Air is withdrawn through conduit 21 by means of a flexible connection (not shown) communicating with the source of vacuum. The device is then rotated upon the supports 22 to bring the axis of the reservoir 19 into a position for filling the chamber of tubular member B to a level above the inlet 14 of the stem 13. In this operation the axis of the reservoir 19 moves from a downwardly extending position toward the horizontal and may move beyond the horizontal toward the vertically upward position. Mercury flows from the reservoir 19 into the chamber sufficiently to immerse the tip of the penetrometer stem 13. After filling of the penetrometer the tubular member B is rotated in a reverse direction, causing mercury to flow from the chamber into the reservoir tube 19, thus freeing the tip of the penetrometer from the excess mercury. In this operation the axis of the reservoir 19 moves toward the vertically downward position. It is not necessary to remove all of the mercury from the chamber, but merely enough to free the tip of the penetrometer.

When the tip of the penetrometer has been freed from the excess mercury, desired increments of pressure are added by introducing gas through conduit 21 and through a flexible connection and valve means (not shown) leading to a source of gas, the increments being measured and the movement of the mercury along the graduated portion of the stem being noted as in the usual practice of making determinations with the penetrometer.

The use of the penetrometer for determining pore spectra by intrusion requires the following manipulations: First, the sample must be introduced into the sample bulb and the closure applied. Second, gas must be evacuated from the volume within the penetrometer, including the pore volume of the sample. Third, without admission of gas, the open tip of the penetrometer stem must be immersed in a pool or reservoir of mercury to a depth such that there is enough mercury above the stem tip to fill the penetrometer. Next, sufficient pressure must be applied to the surface of the mercury pool to cause mercury to fill the penetrometer surrounding the contained sample. Then, the tip of the penetrometer must be freed from the mercury pool. Finally, means must be provided to increase the pressure applied to the penetrometer in a stepwise manner, as hereinbefore described, and further means to determine any change in level of mercury in the penetrometer stem resulting from penetration into the sample as the pressure is increased. As is well known in the art, the required increase in pressure can be effected simply by admitting controlled amounts of air from the atmosphere, if the pores being measured are coarse (larger than about 10 microns diameter). At superatmospheric pressures, as when the penetrometer has been transferred to a porosimeter for the measurement of smaller pores, the pressure can be increased by introducing gas or hydraulic fluid by means of a pump or from a high pressure reservoir. Change in mercury level in the penetrometer stem can be determined by visual observation if the penetrometer is being pressured in a transparent chamber, as in the device of this invention. For this purpose, the stem of the penetrometer is calibrated with respect to volume and marked with suitable graduations 15. The difference between two successive readings then represents the volume of the pores in a size interval corresponding to the pressure levels applied. If desired, the penetrometer stem can be used in conjunction with a resistance or capacitance circuit for measurement of change in the mercury level. For this purpose, the stem is constructed with uniform internal diameter, and the intruded volume is proportional to the change in level determined electrically.

In the modification shown in FIG. 2, the structure is similar and includes bulb or casing 10b which forms the chamber for the porous sample and which is closed by closure 12. The penetrometer is supported and sealed by a bell-shaped member 24 formed integrally with the tubular member B'. In this structure, flange 23 is an integral tapered front portion of the member 10b which forms a seal with and is supported by a tapered integral portion 24 of the tubular member B'. This results in providing a sample-receiving bulb 10b accessible through closure 12 and outside of the tubular body B'. The gripping flanges 23 and 24 not only provide a seal but also support the member 10b bodily outside the tubular member B'.

In the structure shown in FIG. 3, I provide separate support bearings and separate seals. A central support bearing 25 formed of rubber, neoprene or other suitable material receives the stem 13. On the outer side of the bearing 25 is a ring 26 of elastomeric material such as rubber, neoprene etc. and having an apertured diaphragm 27 extending outwardly as indicated and thus providing a seal for retaining vacuum. On the other side of the member 26 is a similar ring 27 having an inwardly-turned apertured diaphragm 28 and useful for retaining pressure. Thus, the seals are directional, i.e., they will exclude gas coming from the direction toward which the edge is curved. Hence, as shown, one seal serves to hold vacuum and if the device were used above atmospheric pressure the second seal 28 will retain the pressure.

In the illustration given in FIG. 4, the tubular member B3 is provided with a conduit leading to a vacuum pump and to an air supply. There is a separate bearing support 29 for receiving the stem 13. 30 designates a member secured within the end portion of the tubular member B3, and providing a valve seat in which is mounted an O-ring 31. A gland nut 32 is provided with a threaded portion engaging a threaded portion of the member 30 so that the O-ring 31 may thus be clamped against the seat 30 to provide a tight seal. As the O-ring is compressed, its inside diameter decreases, thus contacting and sealing against the penetrometer stem.

I have found that the embodiment illustrated in FIG. 4 may be used without the bearing 29, if desired. In this event the length of the valve seat may be lengthened to provide additional support.

In the structure shown in FIG. 4, the conduit 21c is at the top of the body B3 and thus contrasts with the conduits 21, shown in FIGS. 1–3, and in which the conduit leaves the side of the tubular member.

In the structure shown in FIG. 4, the tubular member B3 is non-rotating and mercury is supplied to the chamber above the inlet to the stem 13 and lowered below this level by other means. If desired, the passage 33 communicating with the chamber of tubular member B3 and equipped with a valve 34 may be connected to a reversible mechanical pump. The pump may be connected with a source of mercury and may pump the mercury to a level above the inlet of stem 13 and lower the mercury below this level.

Instead of using a reversible pump, the passage 33 may simply lead to a mercury supply vessel and the vacuum may be employed to raise the mercury. When the level is subsequently lowered without disturbing the vacuum, the length of the mercury column in the tube between the bottom of the device and the leveling bulb communicating with the mercury supply should be sufficient to balance atmospheric pressure during the level-lowering operation. In the structure shown, this length is about 3 feet below the filling device. A conventional leveling bulb may be attached to the nipple 35 by a flexible tube.

In FIGS. 5 and 5A the penetrometer stem 13 is supported by a pair of spaced O-rings 36. Each O-ring is retained between a pair of annular washers 37, and the washers and O-rings are received by annular recesses 38 provided in cylindrical sleeve 37. The sleeve is seen to have a central longitudinally extending bore 40 providing the sleeve with an inner wall wherein the recesses are formed. The inside diameter of the O-rings is slightly less than the outside diameter of the stem, and when the stem is forced through the O-rings, the rings stretch and seal against the penetrometer and against the sleeve 39. A single O-ring 36 provides sufficient sealing against both vacuum and pressure, but I have found that two O-rings provide a better bearing system to support the weight of the penetrometer.

In all of the modifications illustrated, it will be noted that there is one chamber in which vacuum and pressure are applied, while at the same time the sample-supporting chamber of the penetrometer lies outside of the tubular member and is directly accessible for the introduction and removal of the sample within the chamber of the penetrometer. By supporting the stem at an intermediate point within the tubular member B, the penetrometer is balanced within member B and the sealing in this area reduces the size of the chamber which must be evacuated or pressurized in the operation of the device. At the same time, the sample-receiving chamber of the penetrometer may be enlarged to any desired size without interfering with the operation of the other apparatus parts.

At times it may be desirable to introduce the sample while the penetrometer is in a vertical or inclined position, for example, when a powdered sample is introduced. Also, it may be desirable to weigh the penetrometer before and after filling. In either case the penetrometer is readily removable from, and replaceable in, the body.

The tubular body provides undistorted visibility of the calibrations, and, the absence of constrictions permits the uncalibrated length of the penetrometer to be reduced to a minimum. For example, an uncalibrated length of one inch is sufficient to both seal and support the penetrometer. Further, the same body may receive penetrometers having different stem lengths since the calibrations may be positioned anywhere along the length of the body.

The penetrometer is rotatable with respect to the body, and this permits the penetrometer to remain in a fixed position while the body is turned during the filling procedure. There are circumstances, especially in the measurement of large pores and with samples in the form of thin sheets, where it is important to keep the sample in a fixed position. If the penetrometer is turned during filling, the position of the sample may change and may not be restored by the buoyancy of the mercury.

In the illustrations given in FIGS. 1–3 I have shown the apparatus arranged in a position for rotation on supports. If desired, the apparatus may be tipped or otherwise manipulated for filling the stem 13 and for freeing the stem for admission of atmospheric or superatmospheric pressure.

While in the foregoing specification I have set out specific embodiments of the invention in considerable detail for the purpose of illustrating the invention, it will be understood that such details may be varied widely by those skilled in the art without departing from the spirit and scope of my invention.

What is claimed is:

1. In combination, a tubular body having a closed end and an open end, a penetrometer having a chamber for receiving a sample of porous material to be tested and provided with a removable closure, said penetrometer having a hollow stem communicating with said chamber at one end and having its other end open and spaced from the closed end of said tubular body, means within said open end of said tubular body for supporting said stem within the end of said tubular body inwardly of said penetrometer closure and for closing the end of said tubular body whereby said penetrometer chamber is exposed exteriorly of said tubular body, means for connecting said tubular body alternately with vacuum and gas sources, means for supplying liquid to the interior of said tubular body for filling said penetrometer through said stem, and means for withdrawing liquid away from the open end of said stem.

2. The structure of claim 1 in which said tubular body is supported for rotation with the longitudinal axis thereof in a horizontal plane.

3. The structure of claim 1 in which means for supplying liquid to the interior of said tubular member comprises an angularly-extending reservoir tube communicating with said chamber.

4. The structure of claim 1 in which said stem is carried by a support mounted in said tubular body and in which resilient sealing members are provided on opposite sides of said support for sealing the interior of said tubular body against loss of pressure and vacuum.

5. The structure of claim 4 in which one of said sealing members has a diaphragm apertured to receive said stem and with the diaphragm extending outwardly and in which the other of said sealing members has an apertured diaphragm with the diaphragm extending angularly inwardly.

6. The structure of claim 1 in which the tubular body has near its open end a seat secured within said body, a sealing ring within said tubular body adjacent said seat, and adjustable means for pressing said sealing ring against said seat.

7. The structure of claim 1 in which said tubular body is provided with a depending hollow leg leading to a source of liquid, and means for drawing liquid from said source to supply liquid to said penetrometer stem and for withdrawing liquid away from the open end of said stem.

8. The structure of claim 1 in which said stem is slidable and rotatable within said supporting means.

9. The structure of claim 1 in which said supporting means and closing means include spaced-apart O-rings supported by said tubular body, said stem being inserted through said O-rings.

10. The structure of claim 9 including a generally cylindrical sleeve received by said tubular body, said sleeve having a central bore providing an inner wall, said wall having a pair of spaced-apart annular recesses therein, said O-rings being received in said recesses.

11. In combination with a penetrometer having a closure-equipped chamber for receiving a sample of porous material and a hollow stem communicating with the chamber, a tubular member having a closed end and having also an open end, means for slidably and sealably uniting portions of said penetrometer stem and the open end portions of said tubular body for supporting said stem within said tubular body and with the open end of the stem spaced from the closed end of said tubular body, said penetrometer chamber being exterior of said tubular body, means for alternately connecting said tubular body with vacuum and gas sources, and means supplying liquid to said tubular body for filling said penetrometer through said stem and for withdrawing liquid away from the open end of said stem.

12. The structure of claim 11 in which said slidably and sealably uniting means comprise tapered telescoping joints.

References Cited

UNITED STATES PATENTS

| 2,886,964 | 5/1959 | Shapiro et al. | 73—38 |
| 3,022,657 | 2/1962 | Hampton | 73—38 |

LOUIS R. PRINCE, Primary Examiner

WILLIAM A. HENRY II, Assistant Examiner